J. C. Thayer,
Milk Cooler.
No. 88,096. Patented Mar. 23, 1869.
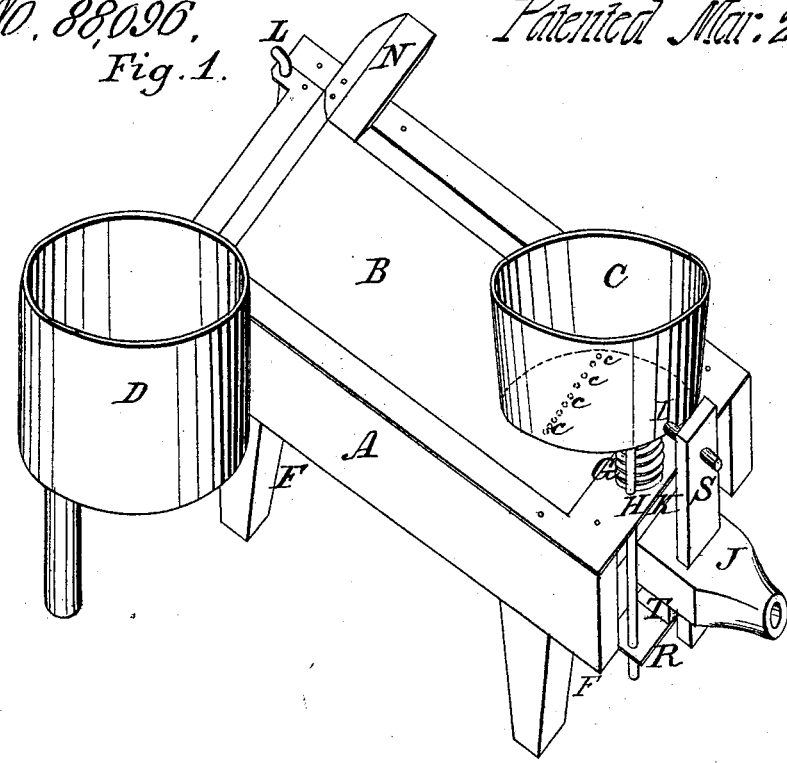
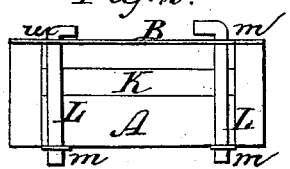
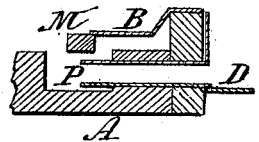
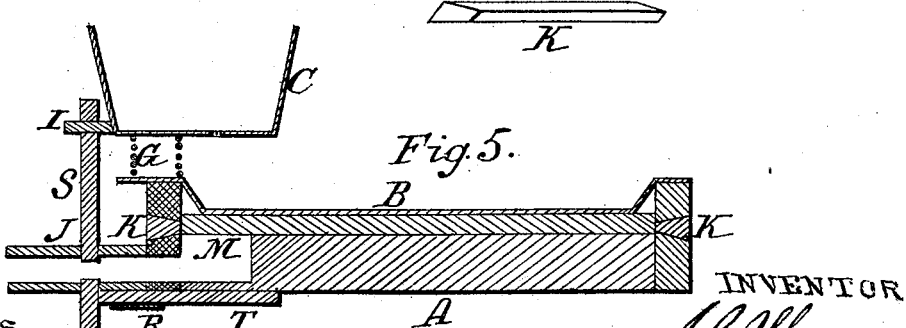
WITNESSES.
S. Van Patten.
W. A. Eldridge.
INVENTOR
J. C. Thayer
By his attorney
G. L. Chapin

J. C. THAYER, OF DUNTON, ILLINOIS.

Letters Patent No. 88,096, dated March 23, 1869.

IMPROVEMENT IN MILK-COOLER.

The Schedule referred to in these Letters Patent and making part of the same.

*To all whom it may concern:*

Be it known that I, J. C. THAYER, of Dunton, in the county of Cook, and State of Illinois, have invented an Improved "Milk-Cooler;" and I do hereby declare that the following is a full, clear, and exact description thereof, which will enable others skilled in the art to make and use the same, reference being had to the accompanying drawings, and letters marked thereon, making a part of this description, in which—

Figure 1 is a perspective representation of my invention.

Figure 2, an end elevation of the same, showing the manner of so closing the water-chamber, that access may be readily had to it for cleaning-purposes.

Figure 3, a broken transverse section of the cooler and water-tank, showing how they are connected.

Figure 4, a perspective representation of one of the end-pieces, which close the water-chamber.

Figure 5, a longitudinal section of the invention.

The nature of the present invention consists in the combination of a spring-balanced milk-tank, with a cooler, said tank being so arranged by means of a stop-cock, operated by the weight of the milk in the tank, that the flow of water through the cooler is controlled automatically; and further, in the novel manner of so securing the ends of the water-tank, that they may be readily removed for the purpose of cleaning the cooler when it becomes necessary.

A represents the cooler, which is so constructed as to have a suitable metal cooling-pan, B, over which milk flows, as it is cooled, and a cold-water passage below the pan, as shown by the space between it and the wood-work A, (fig. 3,) said space being equal in area to the surface of the pan, except that part taken up by the rib M, (figs. 3 and 5,) to which the bottom of the pan is fastened, to prevent it from rising up, and out of place, by the pressure of water in the aforesaid chamber below it.

Both ends of the water-passage, or chamber are closed with wedge-shaped pieces of wood, K, (figs. 1, 2, 4, and 5,) which may be readily removed, by lifting the keys L from the eyes *m m*, &c., attached to the part A, and by lifting out the two standards H, (fig. 1,) which pass through the margin of the pan B, and also through a plate, R, attached to the under side of a discharge-spout, J, and not only hold the piece K in place, but support the tank C, to which their upper ends are rigidly fastened.

This tank C rests upon a coil spring, G, figs. 1 and 5, which is strong enough to close a valve, S, passing through the escape-pipe J, when there is no milk in the tank, but is flexible enough to so settle down when there is milk in the tank, as to open the valve, as shown at fig. 1, and permit a suitable quantity of water to pass under the pan to cool the milk flowing over its upper surface, to a discharge-spout, N, fig. 1.

The valve S consists of a piece of wood or metal fastened to an arm attached to and projecting out from the milk-tank C, passing through the discharge-pipe, and having a hole through it, corresponding in size to the size of the hole in the pipe J, the valve closing the discharge-pipe, as the quantity of milk decreases in the tank C, and thus reduces the flow of water, according to the amount of milk passing from the tank to the cooling-pan B.

The water-tank D has an ordinary construction, and communicates with the water-chamber below the pan B, by means of a pipe, P, fig. 3, the water being conveyed to the tank by any means most convenient.

Operation.

The tank D should be first supplied with water, after which the tank C can have placed in it any quantity of milk, not exceeding its capacity. No further care is necessary until it is cooled.

Having thus described my invention,

What I claim, and desire to secure by Letters Patent of the United States, is—

1. The combination of the milk-tank C, spring G, valve S, discharge-pipe J, water-tank D, and cooler A B, as and for the purpose set forth.

2. The cooler A B, removable end-pieces K, rods L, eyes *m m*, standards H, spring G, discharge-pipe J, arm I, valve S, plate R, and tanks C D, as shown and specified.

J. C. THAYER.

Witnesses:
S. VAN PATTEN,
W. A. ELDRIDGE.